May 5, 1959
F. BROICH ET AL
2,885,432
PROCESS FOR THE PRODUCTION OF ALKYL ESTERS
OF AROMATIC DICARBOXYLIC ACIDS
Filed Aug. 26, 1955
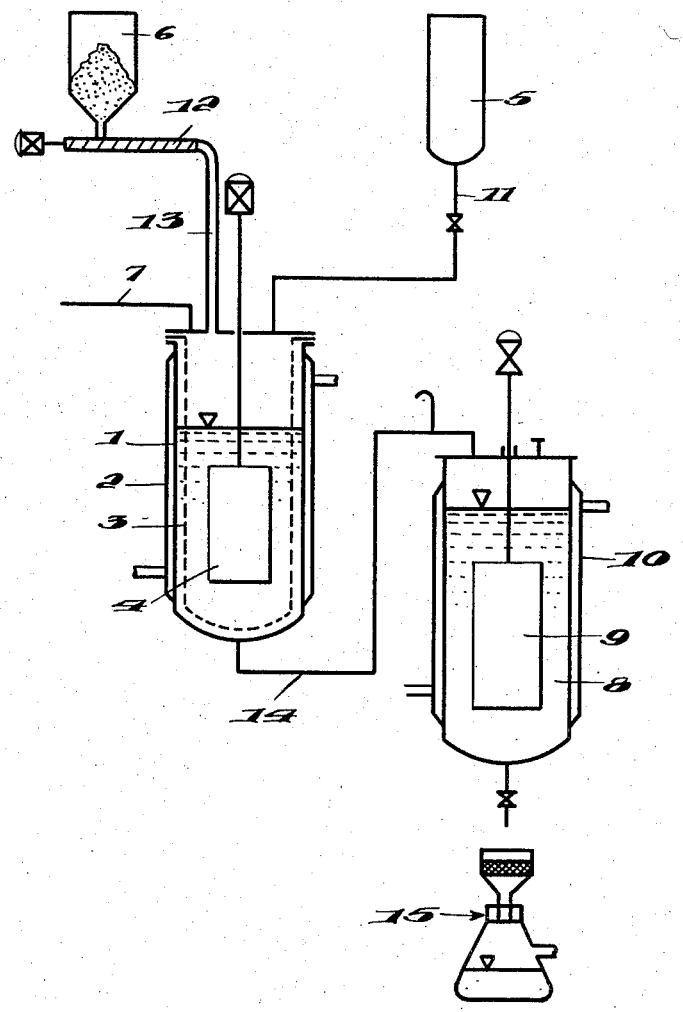
INVENTORS
Franz Broich
Gunthard Hoffmann
Ferdinand List
BY Pierce, Scheffler & Parker
ATTORNEYS

United States Patent Office 2,885,432
Patented May 5, 1959

2,885,432

PROCESS FOR THE PRODUCTION OF ALKYL ESTERS OF AROMATIC DICARBOXYLIC ACIDS

Franz Broich, Gunthard Hoffmann, and Ferdinand List, Marl, Germany, assignors to Chemische Werke Huls Aktiengesellschaft, Marl, Germany, a corporation of Germany Application August 26, 1955, Serial No. 530,732

Claims priority, application Germany October 6, 1954

3 Claims. (Cl. 260—475)

The esterification of alcohols with high melting dicarboxylic acids which are insoluble or difficultly soluble in said alcohols involves considerable difficulties, especially when the ester, such as the terephthalic acid ester, also is poorly soluble in the alcohol. Toward the end of the esterification a suspension forms which is a mixture of the unesterified acid and crystallized ester. The crystallized ester envelops a part of the acid so that it is practically impossible to obtain an acid-free ester product. The alcohol can be used in such a large excess that the formed ester remains dissolved in the warm reaction mixture but then the unfavorable space-time-yield must be taken into consideration.

It has been found that these difficulties can be avoided if the esters of alcohols with high melting dicarboxylic acids which are insoluble or difficultly soluble in the alcohol are formed in the presence of esterification catalysts and if the high melting dicarboxylic acid is suspended in the mixture of alcohol and esterification catalyst, the mixture is heated, and the formed ester is separated from the unreacted acid as a solution thereof containing water and esterification catalyst by replacing the alcohol and catalyst content of the reaction mixture by means of fresh alcohol and catalyst. The ester is then recovered from the displaced solution.

The lower alkyl alcohols such as methyl, ethyl, propyl etc. alcohols are suitable for the esterification. Suitable high melting dicarboxylic acids which are insoluble or difficultly soluble in these alcohols are for example isophthalic acid, terephthalic acid, isocinchomeronic acid, etc. Hydrogen chloride, boronfluoride etc. and in general all known esterification catalysts may be used which are soluble in the alcohol used. The use of volatile esterification catalysts such as hydrogen chloride and boronfluoride is especially advantageous with respect to the separation and recovery of the ester from the solution.

The high melting dicarboxylic acid is suspended in the mixture of alcohol and the esterification catalyst in a reaction vessel. The suspension is heated with stirring to a temperature above 60° C. The ester forms with the liberation of the corresponding amount of water which dissolves in the excess of alcohol. Before the esterification mixture becomes saturated with the ester and begins to deposit solid ester the alcoholic solution of ester which contains water and the esterification catalyst is withdrawn and separated in known manner e.g. by filtration, centrifuging, decantation etc. from the unesterified acid. At the same time the withdrawn solution is replaced by fresh esterification catalyst and alcohol and the esterification of the unesterified acid is continued. It is advantageous to carry out the process in an extraction apparatus in which the high melting acid is retained and through which the catalyst-containing alcohol flows continuously.

The formed ester is recovered in known maner from the separated alcohol solution which contains water and catalyst, for example by cooling and crystallization. The mother liquor, after the separation of water therefrom and if necessary after the addition of catalyst, can be returned to the process. Under some circumstances the solution may be handled by distillation but then the water must be preliminarily separated in order to prevent the catalyst from decomposing the ester.

The ester produced by the process is free of acid and half-ester and can be used for example as plasticizer without purification.

The invention is further described in the following illustrative specific example which includes also a description of apparatus suitable for carrying out the process which is diagrammatically illustrated in the accompanying drawing.

Referring to the drawing 1 is a cylindrical reaction vessel having a steam jacket 2, an extraction shell 3 made of glass fabric and a stirrer 4. Methanol is supplied to the vessel 1 from the measuring tank 5 through the pipe 11, terephthalic acid is supplied from the hopper 6 through the screw feed 12 and pipe 13 and hydrochloric acid is supplied through the pipe 7. The vessel 1 is filled with methanol from the tank 5 and maintained full by means of a levelling tube (not shown). 200 parts by weight of dry terephthalic acid are introduced into the shell 3 from the hopper 6 and the contents of the vessel are heated to 60° C. by the steam jacket 2. At the same time a small stream of dry hydrochloric acid gas is introduced through the pipe 7 as catalyzer. After about 3 hours the withdrawal of methanol from the vessel 1 is started and continued at the rate of about 400 parts by weight per hour. The withdrawn methanol is delivered through the pipe 14 to the vessel 8 in which it is stirred by the stirrer 9 and cooled to about 15° C. by means of the cooling jacket 10. This results in the precipitation of crystals of terephthalic acid methyl ester. The cooled alcohol and suspended ester are delivered from the vessel 8 to the suction filter 15 where it is separated from the alcohol, the water and hydrochloric acid dissolved therein. A further quantity of the terephthalic acid dimethyl ester may be recovered from the mother liquor by concentration. At the same time the methanol content of the mother liquor is recovered and with the addition of the required amount of new methanol is returned to the process. When, after about 10 hours, the original charge of terephthalic acid in the extraction shell 3 has been consumed, 20 parts by weight per hour are introduced from the hopper 6. In the first 10 hours 225 parts by weight of pure terephthalic acid dimethyl ester having a melting point of 141.5° C. are produced. This is a yield of 96%.

We claim:

1. Process for the production of an ester of an aliphatic alcohol containing up to 3 carbon atoms with a high melting aromatic dicarboxylic acid which is only sparingly soluble in said alcohol which comprises mixing a quantity of said alcohol in liquid form with a quantity of said acid in finely divided solid form which is in excess of that which is soluble in said quantity of said alcohol at the reaction temperature and an esterification catalyst, warming the resulting mixture to a reaction temperature of at least 60° C. but below the melting point of said acid and below the boiling point of said alcohol, separating liquid phase consisting essentially of unreacted alcohol, water, catalyst and said ester from the solid phase of said mixture consisting essentially of unreacted acid before said liquid phase becomes saturated with said ester, recovering ester from the withdrawn liquid phase and continuing the esterification of said unreacted acid with a fresh supply of said alcohol and catalyst.

2. Process as defined in claim 1 in which the alcohol is methanol, the aromatic dicarboxylic acid is terephthalic acid and the catalyst is hydrogen chloride.

3. Continuous process for the production of an ester which comprises substantially continuously supplying an aliphatic alcohol containing up to 3 carbon atoms, a solid high melting aromatic dicarboxylic acid which is only sparingly soluble in said alcohol and an esterification catalyst to a reaction chamber, the quantity of said acid maintained in said reaction chamber being in excess of that which is soluble in the quantity of said alcohol maintained in said reaction chamber at the reaction temperature, mixing and heating the resulting mixture to a reaction temperature of at least 60° C. but below the melting point of said acid and below the boiling point of said alcohol, continuously withdrawing the liquid phase of said mixture consisting essentially of unreacted alcohol, water, catalyst and ester from said reaction chamber thereby separating it from the solid phase therein consisting essentially of unreacted solid acid before said liquid phase becomes saturated with said ester, separating said ester and water from said withdrawn liquid phase and returning the resulting solution consisting essentially of alcohol and catalyst together with a fresh supply of said alcohol to said reaction chamber.

References Cited in the file of this patent

UNITED STATES PATENTS

| | | |
|---|---|---|
| 2,459,014 | Cavanaugh et al. | Jan. 11, 1949 |
| 2,479,066 | Gresham | Aug. 16, 1949 |
| 2,578,312 | Miller et al. | Dec. 11, 1951 |
| 2,759,967 | Cash et al. | Aug. 21, 1956 |